UNITED STATES PATENT OFFICE.

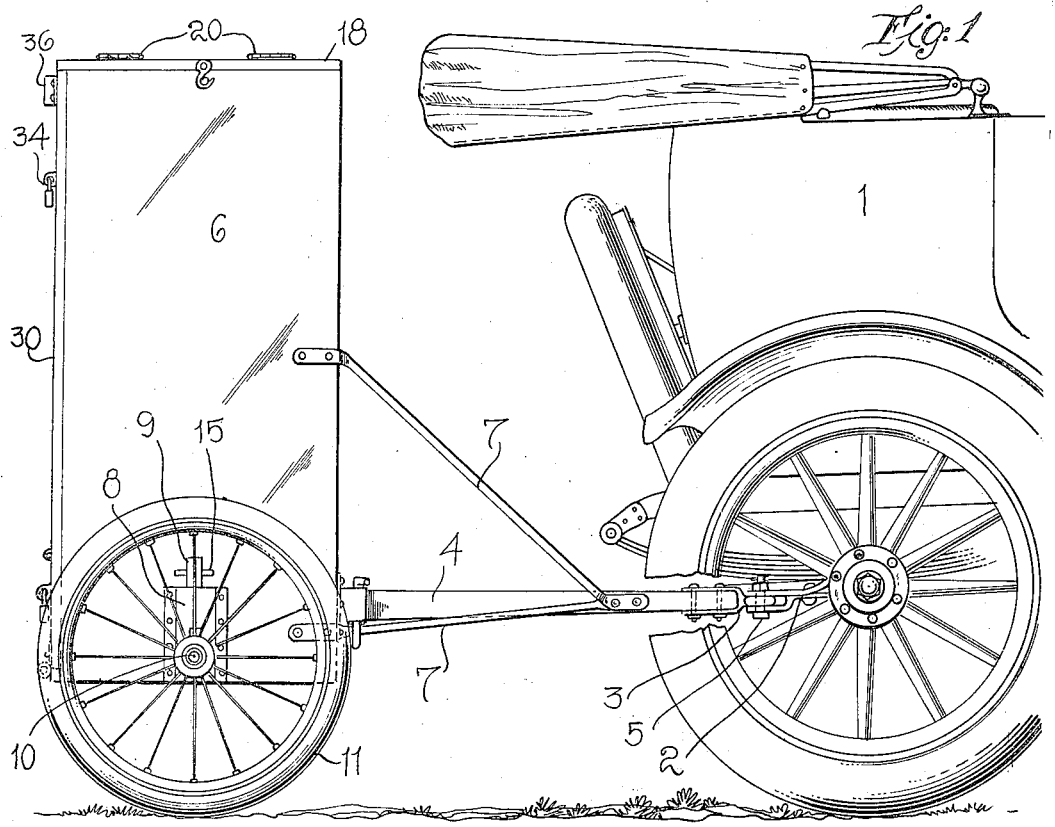
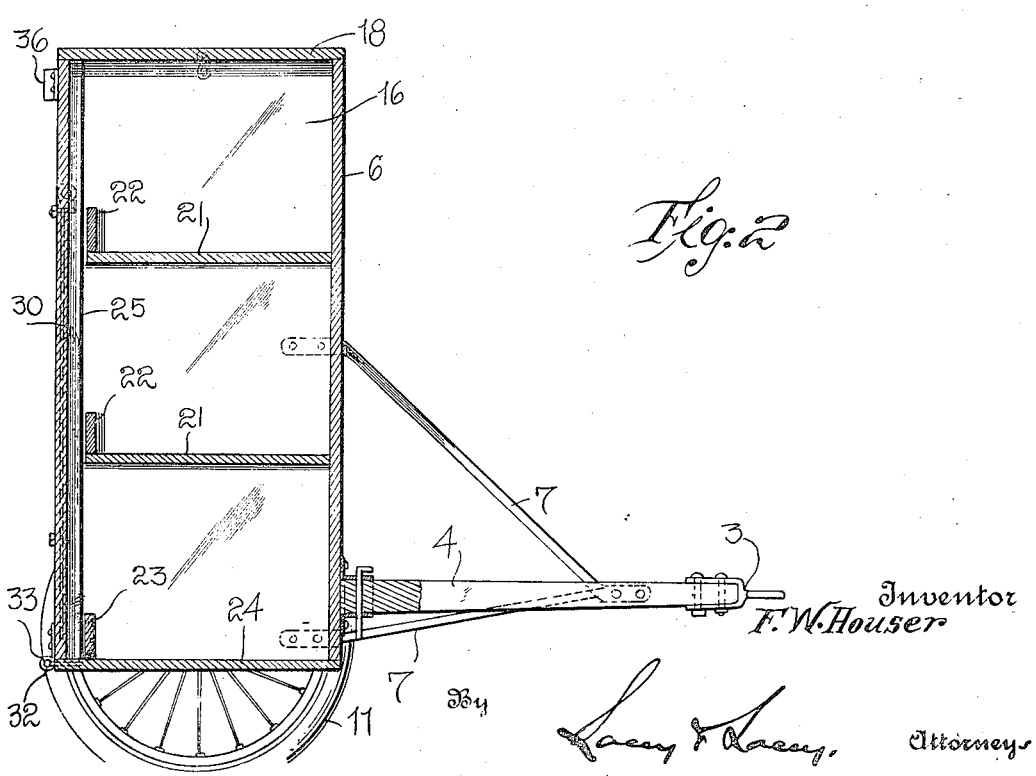

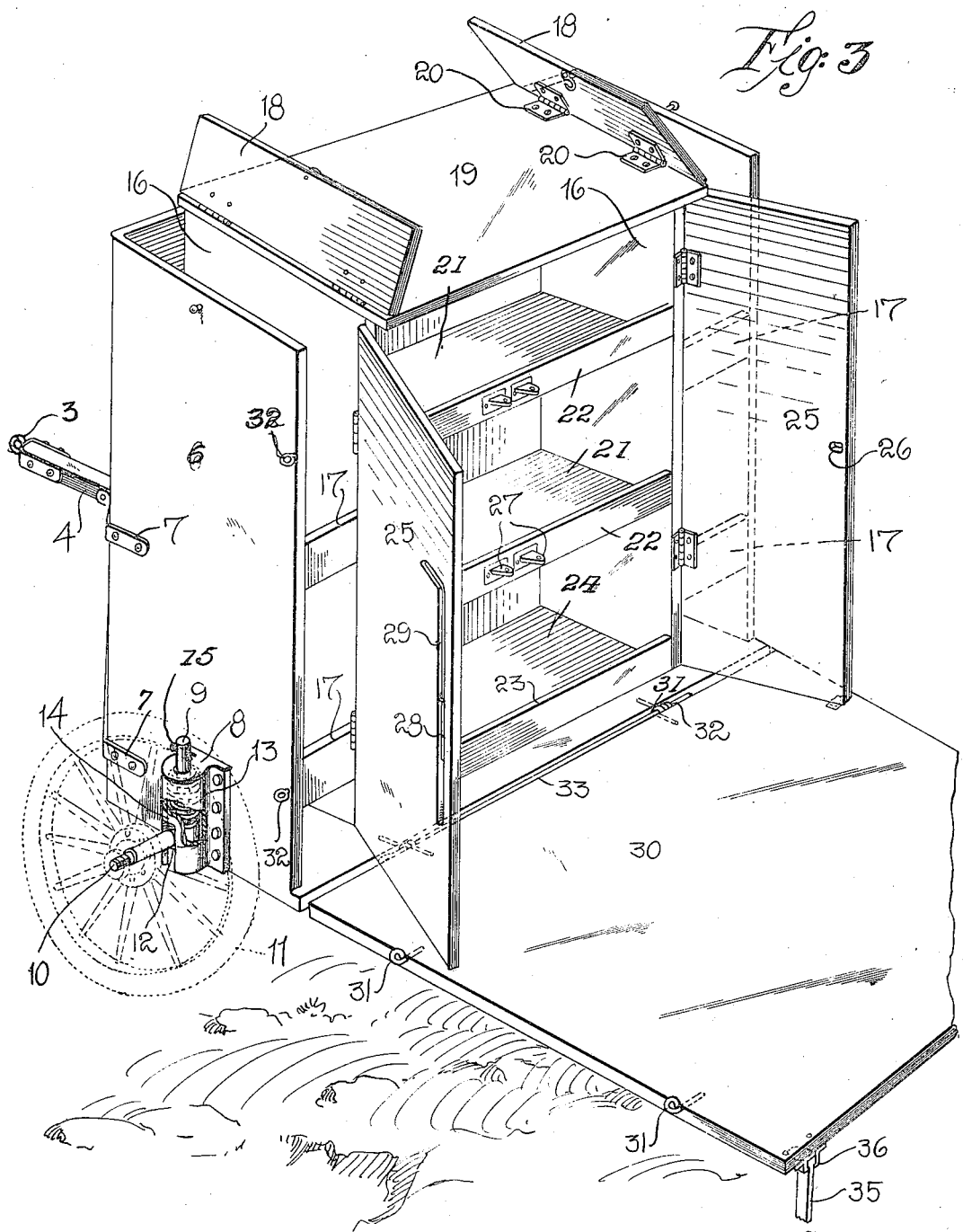

FRANCIS W. HOUSER, OF GERING, NEBRASKA.

TRAILER.

1,320,554.  Specification of Letters Patent.  Patented Nov. 4, 1919.

Application filed October 10, 1918. Serial No. 257,609.

*To all whom it may concern:*

Be it known that I, FRANCIS W. HOUSER, a citizen of the United States, residing at Gering, in the county of Scotts Bluff and State of Nebraska, have invented certain new and useful Improvements in Trailers, of which the following is a specification.

The object of this invention is to provide means whereby motor-car tourists and campers may readily transport from place to place articles of bedding, dishes or other necessities without consuming space in the motor vehicle and thereby subjecting the occupants of the vehicle to inconvenience and discomfort. The invention seeks to provide a portable container which may be readily coupled to an automobile so as to travel in rear of the same without excessive increase of draft.

The invention is illustrated in the accompanying drawings and will be hereinafter fully described, the novel features being subsequently particularly pointed out in the claim.

In the drawings—

Figure 1 is an elevation showing my improved trailer in position to follow an automobile;

Fig. 2 is a central vertical longitudinal section of the trailer;

Fig. 3 is a perspective view showing the device arranged to provide a table and illustrating the several compartments opened for access to the contents thereof.

Referring particularly to the drawings, the reference numeral 1 indicates the rear portion of an automobile which may be of any well-known or preferred type. In carrying out my invention, I secure to the rear axle of the automobile a coupling head 2 which is adapted to receive a coupling head 3 on the front end of a pole 4, a coupling pin 5 being inserted through the mating coupling heads so as to connect the same as will be readily understood. It is also to be understood that the coupling 2 need not always be used as with some types of cars it will be more convenient to secure the pole or draw bar by the clip bolts which secure the rear springs. The pole or draw bar 4 is secured by any convenient or preferred means to the front side of a casing 6 which constitutes the main body of the trailer and rigidity of the pole or draw bar is attained by the use of braces 7 having their front ends secured to the pole and their rear ends secured to the casing 6 at convenient points. Upon the sides of the casing are secured sockets 8 in which are mounted vertical spindles 9 having their lower ends turned outwardly to constitute axles 10 on which ground wheels 11 are mounted, ball bearings of any well-known type being preferably fitted between the axles and the hubs of the wheels as will be readily understood. At the juncture of each spindle 9 and its axle 10, an enlarged body 12 is provided which fits closely but slidably within the socket 8 and furnishes a bearing for a spring 13 coiled around the spindle between the said head and the upper closed end of the socket so that the spindle and axle will be yieldably held to the ground and will be, consequently, permitted to ride over ruts or other inequalities in the surface of the road without imparting excessive vibration to the trailer. To accommodate the vertical movement of the axle, the socket is provided with a vertical slot 14 in its outer side in which the axle 10 plays and a cotter pin or other form of stop 15 may be fitted through or on the upper end of the spindle 9 so as to limit the downward movement of the same and prevents it being ejected from the socket through the expansion of the spring 13.

The trailer may be of any preferred dimensions but will preferably be rectangular having a height approximately equal to the height of the automobile body and a width approximately equal to the width of the automobile body. Within the casing 6 and near the sides of the same are longitudinal partitions 16 which extend from the front to the rear of the casing and from the top to the bottom of the same. The spaces between the partitions and the respectively adjacent sides of the casing constitute cupboards in which cots or other articles may be stored and braces 17 are secured to and extend between the front edges of the partitions and the front edges of the respectively adjacent sides of the casing so as to brace the partitions, as shown, and as will be readily understood. Doors 18 are secured to the top 19 of the casing by hinges 20 and are adapted to extend over the space between the partitions and the sides of the casing so as to protect the stored articles from the weather and from dust, while permitting ready access to the articles when they are needed for use. Between the partitions, I provide a plurality of shelves 21 which are provided with rails or ledges 22 at their front edges to restrain articles which may be placed upon the shelves and a similar rail 23 is secured upon the bottom 24 of the casing adjacent the front edge of the same, as shown. Inner doors 25 are hinged to the front edges of the partitions 16 and are adapted to swing over the space at the front of the shelves so as to form closures for the spaces defined by the shelves and prevent loss of articles stored upon the shelves. These doors are provided with slots 26 near their inner edges through which perforated lugs 27 on the shelves may project when the doors are closed and latch pins 28 are adapted to be inserted through the projecting ends of the said lugs so that the doors will be held in closed position against the shelves. To attain compactness of the parts, the doors are provided in their outer surfaces with grooves 29 to accommodate the pins 28 and aid in preventing bending or loss of the pins. A large outer door 30 is provided to close the entire front of the trailer casing and this door is provided upon its bottom edge and upon one side edge with eyes 31 which are adapted to register with similar eyes 32 on one side wall and the bottom of the casing, a pin or rod 33 being provided to extend through the registering eyes so as to hingedly connect the door to the casing. When the trailer is being transported it will, of course, be closed and the door 30 will then be in a vertical position extending over the front of the casing in which event the rod 33 will be inserted through the eyes on the side edge of the door and the side wall of the casing. Latches 34 of any convenient or preferred type will be provided at the side of the casing opposite the side carrying the eyes 32 so that the door may be secured in its upright or closed position. When access to the interior of the trailer is desired, these latches will be unfastened and the door may then be swung in a horizontal plane so as to open the casing as will be readily understood.

Should it be desired to partake of a meal, the rod 33 is removed from the eyes at the side of the trailer and inserted through the eyes at the bottom thereof so that the lower end of the door will be hingedly connected to the bottom of the trailer. The latches 34 may then be unfastened and the door swung down to the position shown in Fig. 3, legs or posts 35 being fitted in sockets 36 on the outer face of the door at the upper end thereof so as to support the free end of the door when it is lowered. A table will thus be furnished immediately adjacent the trailer so that the table utensils may be quickly placed in position.

It is thought to be clear from the foregoing description, taken in connection with the accompanying drawings, that I have provided an exceedingly simple, inexpensive and efficient device whereby motor-car tourists may transport dishes and bedding without crowding the motor car and without excessively increasing the draft upon the car. The trailer will run closely behind the car so that it will follow in the path of the same and obviously the center of gravity will be low so that it will not tend to vibrate excessively or upset. The articles stored in the trailer will be thoroughly protected against the weather or dust which may be raised by the motor car and yet will be readily accessible when needed for use.

Having thus described my invention, what is claimed as new is:

A trailer for automobiles comprising a casing having an open rear side, means on the front of the casing for coupling the same to an automobile, a door adapted to close the entire rear of the casing, means for hingedly connecting said door to the casing to permit it to swing in a vertical plane or a horizontal plane, and means for supporting the free end of the door when it is swung downwardly in a vertical plane.

In testimony whereof I affix my signature.

FRANCIS W. HOUSER. [L. S.]